United States Patent Office 3,170,801
Patented Feb. 23, 1965

3,170,801
LOW-CALORIE SWEETENING AGENT
John P. McNaught, Saddle River, N.J., assignor to Lever Brothers Company, New York, N.Y., a corporation of Maine
No Drawing. Filed Feb. 1, 1962, Ser. No. 170,493
13 Claims. (Cl. 99—141)

This invention relates to sweetening compositions and more particularly to sweeteners having the appearance and use characteristics of granulated household sugar but which have low caloric value.

Sweetening agents based on combinations of sucrose and synthetic sweeteners such as saccharin or a cyclamate are well known in the art. When these materials are employed in place of sugar, a desired level of sweetness is attained with a concomitant reduction of caloric intake by virtue of the chemical composition of the product and the smaller volume of product required to obtain the desired level of sweetness. These materials are disadvantageous in household use because the consumer must learn to use a smaller volume of the sweetening composition.

Sweetening compositions based on artificial non-nutritive sweeteners and low-caloric extenders are also known in the art. The use of such extenders is undesirable for one or more reasons. Some are quite insoluble and yield turbid dispersions when added to liquids. Others may have a laxative effect. Still others may adversely affect the viscosity of the liquid to which they are added and some are difficult to dissolve under certain conditions where sugar is readily soluble.

Products have been prepared in the past in which the sweetening power of the non-nutritive sweetener on a volume basis can be adjusted in part by adjustment of the bulk density of the finished product, as described in U.S. Patent 2,876,105. These compositions have been completely dependent upon the use of glucose polymers derived from starch by depolymerization followed by heat polymerization and either a gum or a chemically modified cellulose to strengthen the polymer particles or otherwise modify their physical properties.

It is highly desirable to have a sweetening agent which not only could be used on an equal volume basis with conventional household granulated sugar, but which would have the same or superior solubility and non-caking tendencies, would have a minimum of the bitterness associated with cyclamate and saccharin when used in hot or cold beverages, cereals or other foods, and would still have some of the desirable satiety derived from the use of sugar. Such a product would provide those individuals who desire to reduce their caloric intake for health or other reasons with a material which has the attributes of sugar but fewer calories. To make such a product attractive to the consumer, it would have to be low in cost and therefore simple to prepare from commonly used food ingredients.

An object of this invention is to prepare a sweetening composition similar in use characteristics and appearance to granulated household sugar but with a lower caloric content.

Another object is to prepare a sweetening agent in the form of soluble, free-flowing particles which can be used on an equal volume basis with household sugar.

These and other objects and advantages of the invention are attained by preparing a slurry of lactose, an artificial sweetener and a whipping agent in water, and spray-drying the mixture to produce free-flowing particles similar in size and shape to granulated household sugar. An added feature of the invention involves using an edible surface active agent to insure complete solution of the free-flowing particles. The surface active agent may be added to the aqueous mixture prior to spray-drying or the agent may be applied directly to the spray-dried particles.

The product obtained according to the process of this invention consists essentially of lactose, and is modified by containing a water-dispersible edible protein whipping agent and an artificial sweetener. It is preferably in the form of hollow spheres and has an alpha-monohydrate crystalline lactose content ranging from about 25% to about 98%, a bulk density of from about 0.20 to about 0.40 gram per cubic centimeter, a total moisture content of about 3–8% and, on a volume basis, a caloric value of approximately 20–40% of household granulated sugar. The material can be used on an equal volume basis for sweetening coffee, tea, grapefruit, etc., and has the general appearance of granulated household sugar.

In order to prepare a free-flowing spray-dried composition in accordance with this invention, it is important that the product has a total moisture content of about 3% to about 8% by weight and that a maximum amount of the lactose content of the product be in the alpha-monohydrate crystalline form. When in this state, lactose particles maintain their free-flowing characteristics under adverse storage conditions to a greater degree than other sugars such as dextrose, corn syrup solids, finely divided sucrose, etc. Since the caramelization temperature of lactose is higher than that of sucrose, the use of the former material is also advantageous as an effective means of avoiding or minimizing the presence of caramelized specks in the product.

A spray-dried product having the desired bulk density (0.20–0.40 g./cc.) and being as resistant to caking as regular granulated sucrose is obtained by drying the particles to a total moisture content preferably within the range of about 4% to about 6%. This range can be extended to include levels of about 3% to about 8% if an anti-caking agent is added. At these moisture levels which include water present as water of hydration in addition to the free moisture in the product, the lactose monohydrate (alpha) crystalline content ranges from a minimum of about 25% to a maximum of about 98% although a minimum of about 45% is preferred in the absence of an anti-caking agent. For example, one product which was prepared with a moisture content in the desired range had a monohydrate lactose content of about 65%. It can be seen that it is extremely important to spray-dry the lactose solution under conditions whereby the moisture level of the product is within the desired range since the result in terms of the required alpha-monohydrate crystalline lactose content leads to the production of particles having the superior properties set forth above.

The artificial sweetener of this invention includes saccharin and any of the cyclamates such as those described in U.S. Patent No. 2,275,125. Of the various cyclamate salts, it is preferred to use an alkali metal or alkaline earth metal or ammonium salt such as calcium, sodium, potassium and ammonium cyclamate. Mixtures of saccharin and cyclamates can be utilized if desired. When mixtures of these artificial sweeteners are used, the optimum level is about 3 parts of cyclamate to about 1 part of saccharin.

The artificial sweetening agents are employed at a level sufficient to bring the sweetening power of the combination to the sweetening power of an identical volume of sugar. It is understood, however, that if desired, either increased or decreased amounts of the artificial sweetening agent may be used. Furthermore, this invention is not to be limited to the specific agents mentioned above since other artificial sweeteners which are known to those skilled in the art may be employed.

The whipping agent employed according to this invention is a water-dispersible edible protein such as a hydrolyzed caseinate. A preferred caseinate for use in the present invention is commercially available under the designation "Sheftene" from the Sheffield Chemical Company. This material is a powdered agent obtained by partial hydrolysis of casein and is composed of the chloride salts of sodium and calcium in addition to the hydrolyzed casein.

Synthetic detergents such as sodium lauryl sulfate are generally unsatisfactory as a whipping agent in that the caking characteristics and/or bulk density of the product is undesirable. The important consideration with regard to the selection of an appropriate whipping agent is the ability of the agent to provide a sufficiently tough film structure in the foam during the spray-drying operation.

It is also important that the whipping agent be employed at a minimum level in order to reduce the amount of extraneous material present in the composition to as low a level as possible. In the case of the preferred hydrolyzed casein, a level of about 0.1–2% based on the solids content of the composition may be employed with excellent results.

Edible surface active agents as used in compositions of this invention reduce the tendency of the composition to float on the surface of liquids to which the composition has been added and also prevent the formation of a foam or scum on the surface of food. A preferred edible surface active agent is a water dispersible mono-diglyceride mixture. Any animal or vegetable fat or oil may be used as the source of the mono-diglyceride. However, other food-grade surface active agents which are well known in the art may also be employed.

The introduction of a soluble gas into the lactose solution prior to drying is a preferred means for obtaining free-flowing particles having a low bulk density. Although it is preferred to use carbon dioxide, any gas which is soluble in the lactose solution and which is not detrimental to the product may be utilized. Suitable gases include nitrogen and air in addition to carbon dioxide. The gas may be introduced into the solution by the use of conventional techniques such as those described in U.S. Patent No. 2,788,276.

The drying of the aqueous lactose slurry must be carefully controlled. Obviously, the conditions must never be such that caramelization of the sugar occurs. On the other hand, temperature, pressure and other factors may be controlled to yield optimal rates of drying. While the optimum conditions will vary depending on drying facilities and slurry properties, they must be such that when most of the water is removed, there is in the product a certain proportion of lactose in the alpha-monohydrate crystalline state. The final product is composed of free-flowing particles preferably in the form of expanded hollow spheres, the major volume of each particle being occupied by air.

The aqueous slurry may be spray-dried by techniques and using apparatus which are well known to those skilled in the art and as such do not form any part of the present invention.

Since the finished product may at times exhibit a tendency to cake during storage, it may be desirable to include an edible anti-caking agent in the product. One such agent which has been found to be suitable is sodium alumino silicate. If desired, preservatives such as benzoic acid or sorbic acid or the salts thereof may also be employed.

The following examples will serve to further illustrate the invention.

*Example 1*

A sweetener when prepared had the following composition.

| Ingredients: | Percent |
| --- | --- |
| Lactose | 93.5 |
| Water | 5.5 |
| Sodium saccharin | 0.795 |
| Partially hydrolyzed calcium caseinate (Sheftene) | 0.195 |
| Mono-diglyceride derived from cottonseed oil | 0.01 |
| | 100.00 |

The composition was prepared by adding the lactose (alpha hydrate), casein hydrolyzate and saccharin to an amount of cold water (68° F.) sufficient to provide a feedstock containing 50% solids. This batch was spray-dried to a bulk density of about 0.22–0.25 g./cc. and a moisture content of about 5–6%. A high pressure pump was used to feed the slurry to the spray nozzle at 150–200 p.s.i.g. and $CO_2$ was introduced between the pump and the nozzle. Tower air flow was countercurrent with an inlet temperature of 450° F. A Spraying Systems nozzle having a No. 3 orifice and a No. 2 chamber was used. The spray dryer was of pilot plant size, 29 feet high and 9 feet in diameter.

The temperature of the water used in preparing the aqueous mixture of this example was about room temperature. However, water having a temperature as high as about 95° F. can be employed with comparable results. Furthermore, the solids content of the aqueous solution can vary between about 40% and 50%. The pressure in the pump used to feed the aqueous mixture to the spray nozzle can range from about 125–350 p.s.i.g. The air temperature in the spray-drying tower may be varied from about 300° F. to about 450° F.

The spray-dried product obtained in Example 1 was classified according to particle size. The portion of the material having a particle size similar to that of household granulated sugar was retained while the finer material was set aside for reprocessing in a subsequent batch.

When the spray-dried product was used in water or coffee, some surface foam remained after the lactose dissolved in the liquid. However, when .01% of the mono-diglyceride was added to the particles, the product left practically no surface film when dissolved in water or coffee. The mono-diglyceride was incorporated in the product by first preparing a 1% mono-diglyceride/99% lactose mixture and adding this material at a 1% level to the spray-dried particles. The product contained about 65% monohydrate and was equal to granulated sugar in caking characteristics.

No significant flavor difference could be observed between this product and granulated sugar (sucrose) when tested on an equal volume basis in coffee. Since the product was about four times lighter than sugar (0.22 vs. 0.85 g./cc. for sugar), it contained approximately one-fourth as many calories.

*Examples 2–6*

Other formulations were processed according to the procedure described in Example 1 to prepare products within the scope of the invention. The data is as follows:

|  | 2[1] | 3[1] | 4[1] | 5[1] | 6[1] |
|---|---|---|---|---|---|
| Lactose alpha-monohydrate, percent | 97.857 | 98.044 | 98.169 | 98.148 | 98.543 |
| Cyclamate, calcium, percent | 1.450 | 1.310 | 1.216 | 1.030 | 0.935 |
| Saccharin, sodium, percent | 0.483 | 0.436 | 0.405 | 0.342 | 0.312 |
| Sheftene, percent | 0.200 | 0.200 | 0.200 | 0.200 | 0.200 |
| Monoglyceride, percent | 0.010 | 0.010 | 0.010 | 0.010 | 0.010 |
| Total Moisture after drying (percent $H_2O$) [2] | 4.2–4.8 | 5.0–5.6 | 4.5–4.9 | 5.0 | 5.8–7.4 |
| Bulk Density (gm./cc.) | 0.29 | .27–.30 | 0.28–0.31 | 0.31 | 0.26–0.36 |
| Processing Data: |  |  |  |  |  |
| Type of gas injected | $CO_2$ | $CO_2$ | $CO_2$ | $CO_2$ | $CO_2$ |
| Slurry Temp., °F | 70 | 65 | 65 | 65 | 65 |
| Slurry Concentration (Percent Solids) | 50 | 50 | 50 | 50 | 50 |
| Feed Pressure to Nozzle, p.s.i.g | 350 | 130–150 | 150 | 150 | 150 |
| Type of Nozzle | [3] | [3] | [3] | [3] | [3] |
| Direction of Air Flow | Concurrent | Countercurrent | Countercurrent | Countercurrent | Countercurrent |
| Drying Air Temperature, °F | 320 | 425 | 425 | 425 | 425 |

[1] Mixing formulas, dry solids basis.
[2] Ranges indicate max. and min. results of several tests made during the spray drying. Slurry batches were 500–1000 lbs.
[3] No. 2 chamber, No. 3 orifice.

It will be apparent that the embodiments shown are only exemplary and that various modifications can be made in materials and arrangement within the scope of the invention as defined in the appended claims. Thus, under certain conditions a minor amount of lactose can be replaced by sucrose without lessening the advantageous properties attributable to the presently claimed product.

What is claimed is:

1. A sugar substitute consisting essentially of lactose modified by containing about 0.1 to 2% by weight of a hydrolyzed caseinate whipping agent and a minor amount of at least one artificial sweetener, the substitute being in the form of free-flowing particles having a bulk density in the range of 0.20 to 0.40 gram/cc., and having a total moisture content of about 3–8% by weight, at least about 25% and no more than about 98% of the product consisting of alpha-monohydrate crystalline lactose.

2. A sugar substitute comprising from about 0.1 to 2% by weight of a hydrolyzed caseinate whipping agent, at least one artificial sweetener at a level to bring the sweetening power of the composition to the sweetening power of an equal volume of sucrose, a total moisture content of about 3–8% by weight, and the balance lactose, the substitute being in the form of free-flowing particles having a bulk density in the range of about 0.20 to about 0.40 gram/cc., and at least about 25% and no more than about 98% of the product consisting of alpha-monohydrate crystalline lactose.

3. A product according to claim 2 wherein the moisture content of the product is about 4–6%.

4. The product according to claim 2 wherein an edible surface-active fatty acid mono-diglyceride mixture is also present.

5. The product according to claim 2 wherein the sweetener is selected from the group consisting of saccharin and the cyclamate salts.

6. A sugar substitute comprising about 0.2% by weight of a hydrolyzed caseinate whipping agent, at least one artifical sweetener selected from the group consisting of saccharin and the cyclamate salts, the artificial sweetener being at a level to bring the sweetening power of the composition to the sweetening power of an equal volume of sucrose, a total moisture content of about 4–6% by weight, about 0.01% of an edible suface-active fatty acid monodiglyceride mixture, and the balance lactose, the substitute being in the form of free-flowing particles having a bulk density in the range of about 0.20 to about 0.40 gram/cc., and at least about 25% and no more than about 98% of the product consisting of alpha-monohydrate crystalline lactose.

7. A process of preparing a sugar substitute consisting essentially of lactose modified by containing 0.1 to 2% by weight of hydrolyzed caseinate whipping agent and a minor amount of at least one artificial sweetener which comprises: (a) preparing an aqueous slurry of the lactose, whipping agent, and sweetener in water and (b) spray drying the slurry under conditions which provide free-flowing particles having a bulk density in the range of about 0.20 to about 0.40 gram/cc., a total moisture content of about 3–8% and an alpha-monohydrate crystalline lactose content of at least 25% and no more than 98%.

8. A process according to claim 7 wherein the product is dried to a moisture content of about 4–6%.

9. A process according to claim 7 wherein the sweetener is selected from the group consisting of saccharin and the cyclamate salts.

10. A process according to claim 7 wherein an edible surface-active fatty acid mono-diglyceride mixture is added.

11. A process according to claim 10 wherein the monodiglyceride is applied to the surfaces of the spray-dried particles in the form of a mixture containing lactose.

12. A process according to claim 7 wherein a soluble gas is introduced into the aqueous composition prior to the step of spray-drying.

13. A process of preparing a sugar substitute comprising from about 0.1 to 2% by weight of a hydrolyzed caseinate whipping agent, at least one artificial sweetener at a level to bring the sweetening power of the composition to the sweetening power of an equal volume of sucrose, a total moisture content of about 3–8% by weight and the balance lactose, which comprises: (a) preparing an aqueous slurry of the lactose, whipping agent, and sweetener containing about 40–50% solids, (b) supplying the slurry to the nozzle of a spray dryer under pressure, (c) introducing a soluble gas into the slurry while under pressure, and (d) spray drying the slurry to obtain free-flowing particles having a bulk density in the range of about 0.20 to about 0.40, a total moisture content of about 3–8%, and to obtain at least about 25% and no more than 98% of alpha-monohydrate crystalline lactose in the product.

References Cited by the Examiner

UNITED STATES PATENTS

| 2,716,606 | 8/55 | Patterson | 99—14 |
| 2,788,276 | 4/57 | Reich et al. | 99—71 |
| 2,876,105 | 3/59 | Jucaitis et al. | 99—141 |
| 3,014,803 | 12/61 | Peebles et al. | 99—141 |

A. LOUIS MONACELL, *Primary Examiner.*